(12) United States Patent
Egami et al.

(10) Patent No.: US 9,337,694 B2
(45) Date of Patent: May 10, 2016

(54) ELECTRICITY COLLECTION AND DISTRIBUTION RING AND METHOD FOR MANUFACTURING SAME

(75) Inventors: Kenichi Egami, Kitaibaraki (JP); Kazuyuki Watanabe, Hitachi (JP); Kazuhiko Tomita, Hitachi (JP); Toru Sumi, Hitachi (JP); Manabu Yazaki, Wako (JP); Koichi Ono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 395 days.

(21) Appl. No.: 14/111,116

(22) PCT Filed: Apr. 9, 2012

(86) PCT No.: PCT/JP2012/059683
§ 371 (c)(1),
(2), (4) Date: Oct. 10, 2013

(87) PCT Pub. No.: WO2012/141135
PCT Pub. Date: Oct. 18, 2012

(65) Prior Publication Data
US 2014/0246934 A1  Sep. 4, 2014

(30) Foreign Application Priority Data
Apr. 12, 2011  (JP) .................................. 2011-088414

(51) Int. Cl.
*H02K 11/00* (2006.01)
*H02K 3/20* (2006.01)
*H02K 3/52* (2006.01)

(52) U.S. Cl.
CPC ................. *H02K 3/20* (2013.01); *H02K 3/522* (2013.01); *H02K 2203/09* (2013.01); *Y10T 29/49002* (2015.01)

(58) Field of Classification Search
CPC . H02K 2203/06; H02K 3/50; Y10T 29/49002
USPC ...................................... 310/71, 43; 29/592.1
See application file for complete search history.

(56) References Cited

U.S. PATENT DOCUMENTS 6,300,697 B1 * 10/2001 Findeisen ................ H02K 3/50
310/68 B
7,936,100 B2 * 5/2011 Naganawa ............. H02K 3/522
310/71

(Continued)

FOREIGN PATENT DOCUMENTS

JP  2003-324887 A  11/2003
JP  2005-229677 A   8/2005

(Continued)

OTHER PUBLICATIONS

International Search Report, PCT/JP2012/059683 dated Jul. 10, 2012.

*Primary Examiner* — Thanh Lam
(74) *Attorney, Agent, or Firm* — Westerman, Hattori, Daniels & Adrian, LLP

(57) ABSTRACT

Provided is an electricity collection and distribution ring excellent in durability and the easiness of manufacturing while the size thereof is reduced, and also provided is a method for manufacturing the electricity collection and distribution ring. The electricity collection and distribution ring (2) comprises: first to fourth bus rings (21 to 24) for collecting electricity from and distributing electricity to each of the phase coils (111, 112, 113) of a three-phase motor (1); a plurality of fixing members (3) disposed at a plurality of predetermined positions in a circumferential direction of the first to fourth bus rings (21 to 24) and mutually fixing the first to fourth bus rings (21 to 24); and a plurality of connection terminals (4) for connecting the first to fourth bus rings (21 to 24) and the lead-out lines of the respective phase coils (111, 112, 113). The fixing members (3) integrally have a locking portion (30) for, among the first to fourth bus rings (21 to 24), locking the first bus ring (21) positioned at an end in an axis direction and a fixing portion (31) for mutually fixing the other second to fourth bus rings (22 to 24) by molding.

11 Claims, 7 Drawing Sheets

(56) References Cited

U.S. PATENT DOCUMENTS

| | | |
|---|---|---|
| 8,154,163 B2 | 4/2012 | Inoue et al. |
| 2003/0173842 A1* | 9/2003 | Kobayashi ......... H02K 15/0056 310/71 |
| 2004/0070293 A1* | 4/2004 | Kabasawa ............. H02K 3/522 310/71 |
| 2006/0043806 A1* | 3/2006 | Torii ..................... H02K 5/522 310/71 |
| 2007/0080592 A1* | 4/2007 | Ohta ..................... H02K 1/148 310/71 |
| 2009/0256439 A1 | 10/2009 | Inoue et al. |
| 2011/0234031 A1* | 9/2011 | Kato ....................... H02K 3/28 310/71 |

FOREIGN PATENT DOCUMENTS

| | | |
|---|---|---|
| JP | 3902219 B1 | 4/2007 |
| JP | 2009-017666 A | 1/2009 |
| JP | 2009-261082 A | 11/2009 |
| JP | 4465395 B2 | 5/2010 |

* cited by examiner

22 SECOND BUS RINGS
23 THIRD BUS RINGS
24 FOURTH BUS RINGS

21 FIRST BUS RINGS
22 SECOND BUS RINGS
23 THIRD BUS RINGS
24 FOURTH BUS RINGS

2 ELECTRICITY COLLECTION AND DISTRIBUTION RING
30 LOCKING PORTION

ELECTRICITY COLLECTION AND DISTRIBUTION RING AND METHOD FOR MANUFACTURING SAME

CROSS-REFERENCED TO RELATED APPLICATIONS

This application is a National Stage entry of International Application No. PCT/JP2012/059683, filed Apr. 9, 2012, which claims priority to Japanese Patent Application No. 2011-088414, filed Apr. 12, 2011. The disclosure of the prior applications are incorporated in their entirety reference.

TECHNICAL FIELD

The invention relates to an electricity collection and distribution ring for collecting and distributing electricity form and to each of phase coils of a motor having plural phase coils, and a method for manufacturing the same.

BACKGROUND ART

Conventionally, an electricity collection and distribution ring for supplying motor current to each of phase coils of a three-phase AC motor having three phases U, V, and W is known (see Patent Literatures 1 to 3).

This type of electricity collection and distribution ring is composed of four annularly-formed electric wires respectively corresponding to U-phase, V-phase, W-phase and neutral phase, plural fixing members mutually fixing these four electric wires and plural connection terminals for connecting each electric wire to lead-out lines of the coils.

CITATION LIST

Patent Literature

Patent Literature 1: Japanese patent No. 3,902,219
Patent Literature 2: JP-A-2009-17666
Patent Literature 3: Japanese patent No. 4,465,395

SUMMARY OF INVENTION

Technical Problem

From the viewpoint of size reduction and durability of the electricity collection and distribution ring, it is desirable that the fixing member and the connection terminal be arranged close to each other or the connection terminal be provided in an opening formed on the fixing member.

Alternatively, as a means for fixing the four electric wires, the fixing member could be molded so that these four electric wires penetrate through the fixing member. However, it is necessary to arrange a mold so as to surround the fixing member to be formed when molding the fixing member, and there are limitations to bringing the fixing member close to the connection terminal. On the other hand, in case of molding the fixing member so that a portion to be connected to the connection terminal is included therein, there is a problem that a plating formed on a conductor to fuse (heat stake) the connection terminal is peeled off at the time of the molding.

Therefore, it is an object of the invention to provide an electricity collection and distribution ring excellent in durability and easiness of manufacturing while the size thereof is reduced, and a method for manufacturing the same.

Solution to Problem

For the purpose of solving the above-mentioned problems, the invention provides an electricity collection and distribution ring which is provided with plural annular conductors for collecting and distributing electricity from and to plural phase coils, plural fixing members that are disposed at plural predetermined positions along a circumferential direction of the plural annular conductors to mutually fix the plural annular conductors in a state that the plural annular conductors are arranged along an axis direction thereof, and plural connection terminals for connecting the annular conductors to lead-out lines of the coils, wherein the fixing member integrally comprises a fixing portion for mutually fixing the plural annular conductors by molding except a first annular conductor and a locking portion capable of locking the first annular conductor, the first annular conductor being positioned at an end in an axis direction of the plural annular conductors, and the first annular conductor is fixed to the plural fixing members by being locked to the locking portion.

In addition, the plural fixing members may be arranged at positions where the plural connection terminals of the first annular conductor are provided.

In addition, the locking portion of the fixing member may have a bottom surface formed on a bottom portion in the axis direction, an inner locking piece provided on an inner peripheral side of the bottom surface and an outer locking piece provided on an outer peripheral side of the bottom surface, and height of the inner locking piece from the bottom surface may be lower than height of the outer locking piece from the bottom surface.

In addition, the inner locking piece of the fixing member may have an opening formed to open to a radially inner side of the first annular conductor and the connection terminal of the first annular conductor may be connected to the first annular conductor through the opening of the inner locking piece.

In addition, protrusions for holding the first annular conductor may be provided on the outer locking piece at positions facing the opening of the inner locking piece so as to protrude toward the radially inner side.

In addition, the plural fixing members may be arranged at regular intervals along the circumferential direction of the plural annular conductors.

In addition, the first annular conductor may be split at one circumferential point.

In addition, a recessed portion recessed in a radial direction of the first annular conductor is formed on the fixing member at a position facing a tip portion of the lead-out line connected to the coil.

In addition, the plural annular conductors fixed to the fixing portions of the fixed members may be second to fourth annular conductors for supplying power to each of phase coils of a three-phase motor, and the first annular conductor may be a neutral phase of the three-phase motor.

In addition, the second to fourth annular conductors may each have a power supply portion at a circumferential position, and the plural connection terminals may be provided so as to form pairs at positions symmetric with respect to a diametrical straight line including the power supply portion.

For the purpose of solving the above-mentioned problems, the invention provides a method for manufacturing an electricity collection and distribution ring which is provided with plural annular conductors for collecting and distributing electricity from and to plural phase coils, plural fixing members that are disposed at plural predetermined positions along a circumferential direction of the plural annular conductors to mutually fix the plural annular conductors in a state that the plural annular conductors are arranged along an axis direction thereof, and plural connection terminals for connecting the annular conductors to lead-out lines of the coils, the method including a step of mutually fixing the plural annular conductors, except a first annular conductor positioned at an end in an axis direction thereof, by molding the fixing member and a step of locking the first annular conductor to a locking portion that is formed on each of the plural fixing members by the molding.

Advantageous Effects of Invention

According to the invention, it is possible to provide an electricity collection and distribution ring excellent in durability and easiness of manufacturing while the size thereof is reduced, and a method for manufacturing the same.

DESCRIPTION OF EMBODIMENTS

Embodiment

Figure 1:
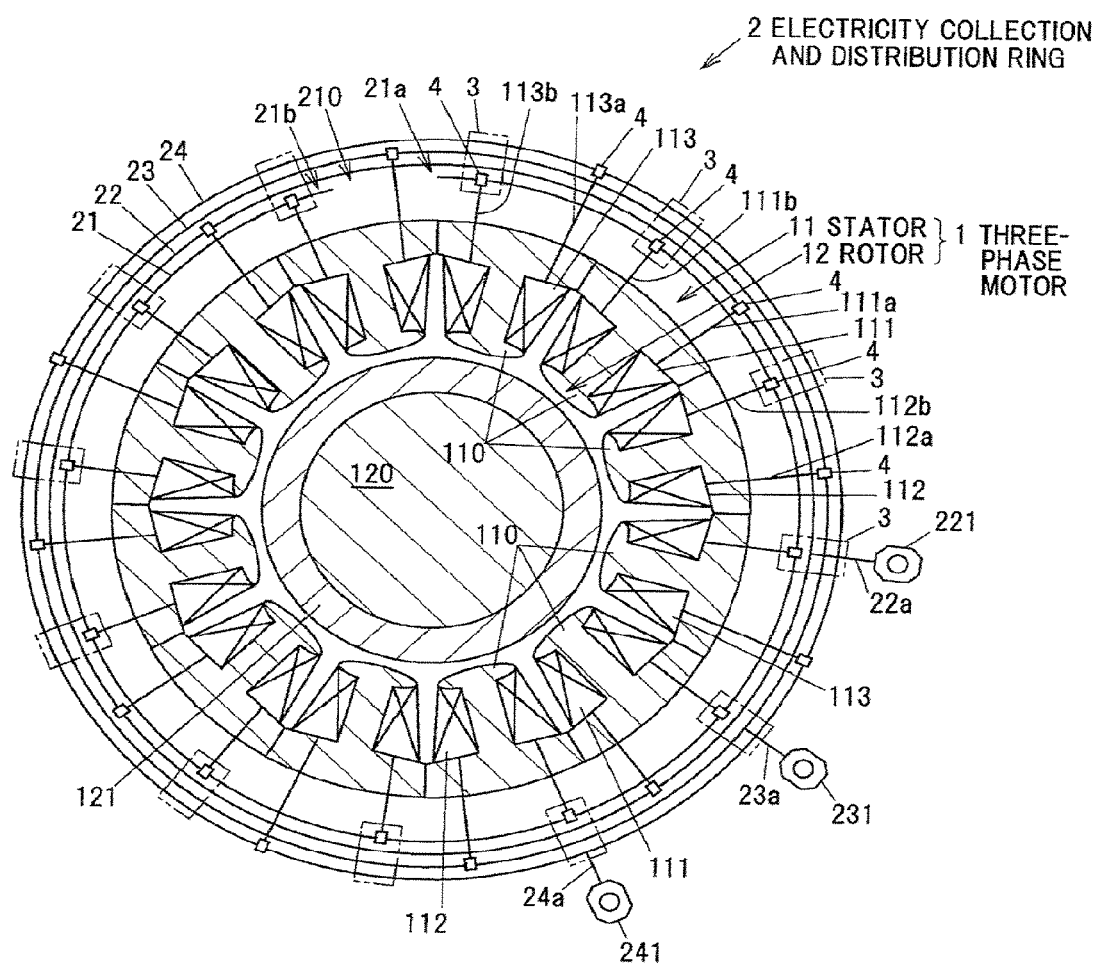
FIG. 1 is a schematic view showing a structural example of an electricity collection and distribution ring in an embodiment of the invention and a three-phase motor.

FIG. 1 is a schematic view showing a structural example of an electricity collection and distribution ring in the embodiment of the invention and a three-phase motor. An electricity collection and distribution ring 2 is arranged so as to surround the entire outer periphery of a three-phase motor 1. It should be noted that, in this drawing, first to fourth bus rings 21 to 24 (described later) of the electricity collection and distribution ring 2 are shown as being arranged in a radial direction for the purpose of the explanation.

Structure of Three-Phase Motor 1

The three-phase motor 1 has a cylindrical stator 11 and a rotor 12 rotatable with respect to the stator 11 on an inner peripheral side of the stator 11. On the cylindrical stator 11, twelve teeth 110 formed of a magnetic material are radially provided, and a U-phase coil 111, a V-phase coil 112 or a W-phase coil 113 is wound around each tooth 110. The U-phase coil 111, the V-phase coil 112 and the W-phase coil 113, four each, are arranged in this order along a circumferential direction of the stator 11 (a clockwise direction in FIG. 1).

The rotor 12 has a shaft 120 rotatably supported by a non-illustrated supporting member so as to be coaxial with the stator 11, and a magnet 121 having plural magnetic poles and fixed to an outer peripheral surface of the rotor 12.

One end of the U-phase coil 111 is connected to a first lead-out line 111a and another end is connected to a second lead-out line 111b. Likewise, one end of the V-phase coil 112 is connected to a first lead-out line 112a and another end is connected to a second lead-out line 112b. Also, one end of the W-phase coil 113 is connected to a first lead-out line 113a and another end is connected to a second lead-out line 113b.

Structure of Electricity Collection and Distribution Ring 2

The electricity collection and distribution ring 2 is provided with the first to fourth bus rings 21 to 24 as the first to fourth annular conductors, plural (twelve in the present embodiment) fixing members 3 and plural connection terminals 4. On the first bus ring 21, twelve connection terminals 4 are provided at regular intervals. On each of the second to fourth bus rings 22 to 24, four connection terminals 4 are provided at regular intervals.

Between the three-phase motor 1 and a non-illustrated motor drive device, the second to fourth bus rings 22 to 24 distribute and collect motor current respectively to and from the U-phase, V-phase and W-phase coils 111, 112 and 113 of the three-phase motor 1. The first lead-out lines 111a of the four U-phase coils 111 are connected to the second bus ring 22 via the connection terminals 4. The first lead-out lines 112a of the four V-phase coils 112 are connected to the third bus ring 23 via the connection terminals 4. The first lead-out lines 113a of the four W-phase coils 113 are connected to the fourth bus ring 24 via the connection terminals 4.

The first bus ring 21 is a neutral phase of the three-phase motor 1 and is connected to the second lead-out lines 111b, 112b and 113b of the respective U-phase, V-phase and W-phase coils 111, 112 and 113 via the connection terminals 4. In addition, the first bus ring 21 is formed in a C-shape split at one circumferential point which is a separated portion 210 between one end portion 21a and another end portion 21b.

In the second bus ring 22, a power supply terminal connecting portion 22a as a power supply portion provided at a circumferential position is connected to a U-phase power supply terminal 221. Likewise, in the respective third and fourth bus rings 23 and 24, power supply terminal connecting portions 23a and 24a as power supply portions each provided at a circumferential position are connected to V-phase and W-phase power supply terminals 231 and 241.

Figure 2A:
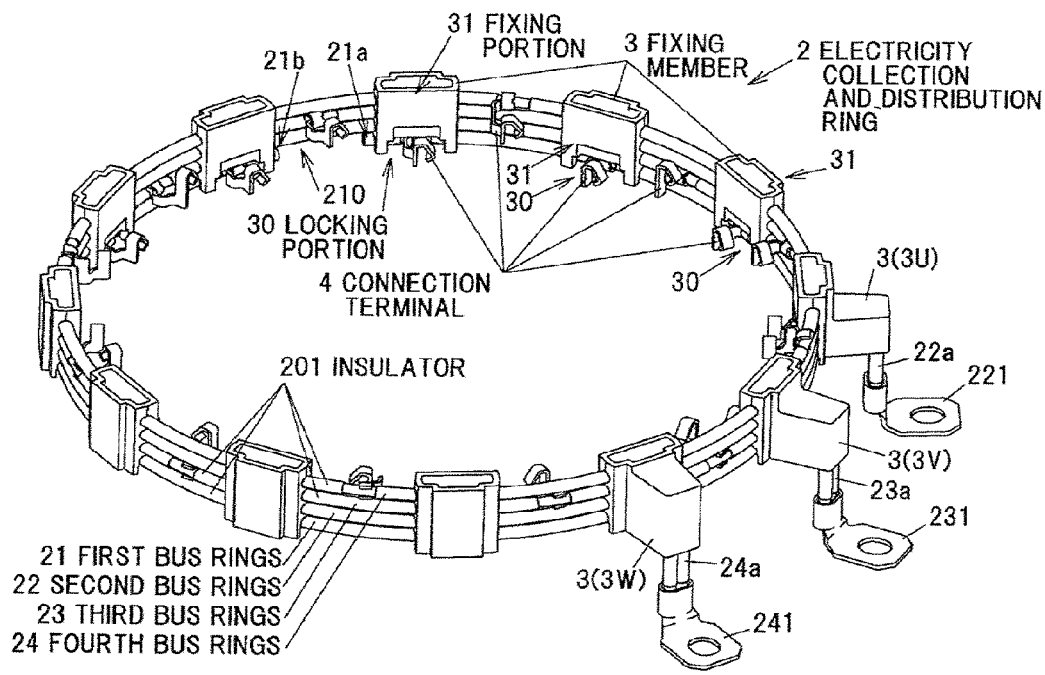
FIGS. 2A and 2B are appearance diagrams of the electricity collection and distribution ring.
Figure 2B:
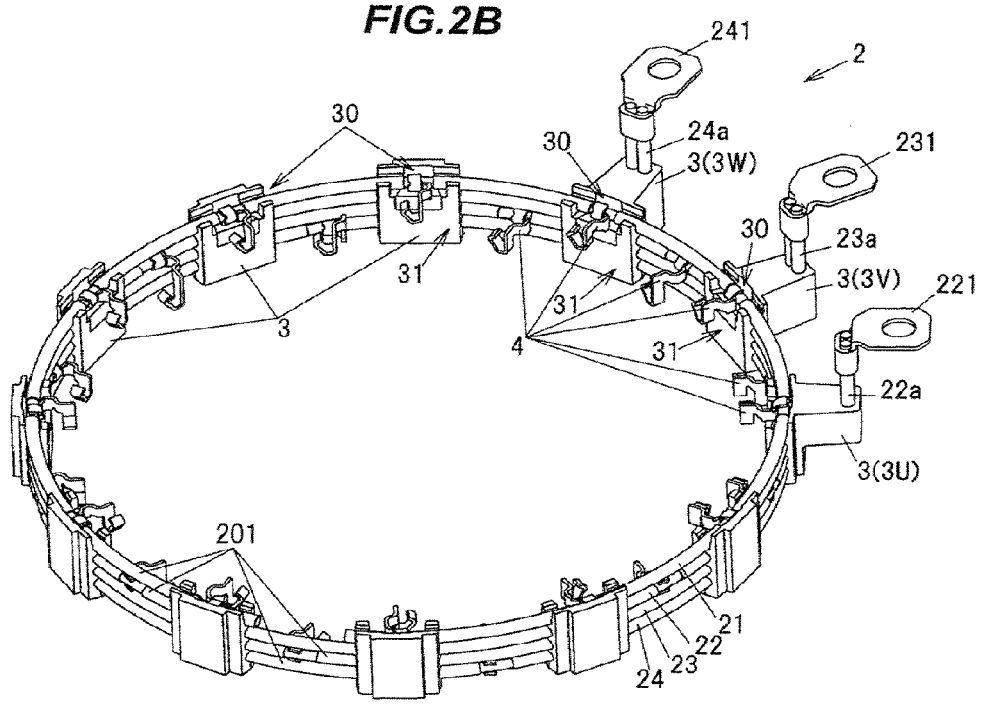

FIG. 2A is an appearance diagram of the electricity collection and distribution ring 2. FIG. 2B is an appearance diagram showing the electricity collection and distribution ring 2 viewed from the direction opposite to FIG. 2A.

As shown in FIGS. 2A and 2B, the first to fourth bus rings 21 to 24 are mutually fixed by the plural fixing members 3 formed of a molding resin in a state of being arranged in parallel along the axis direction thereof. It should be noted that, in the following description, the axis direction of the first to fourth bus rings 21 to 24 of the electricity collection and distribution ring 2 is sometimes simply called "the axis direction". And likewise, a radial direction and a circumferential direction of the first to fourth bus rings 21 to 24 are sometimes simply called "the radial direction" and "the circumferential direction".

The fixing members 3 are provided at positions where the plural connection terminals 4 of the first bus ring 21 are provided. In more detail, each fixing member 3 is arranged only at a position for providing the connection terminal 4 of the first bus ring 21 and is not provided at any other positions. In other words, each connection terminal 4 of the first bus ring 21 is provided in a region within a circumferential width of the corresponding fixing member 3. In addition, each fixing member 3 is provided at a middle position between a pair of circumferentially-adjacent connection terminals 4 which are provided on the second to fourth bus rings 22 to 24.

The plural connection terminals 4 of the first bus ring 21 are provided so as to stick out toward the radially inside from a circumferential region in which each fixing member 3 supports the first bus ring 21. In addition, the fixing members 3 are arranged at regular intervals (every 30° in the present embodiment) along the circumferential direction of the first to fourth bus rings 21 to 24.

The plural fixing members 3 include a U-phase power supply fixing member 3U for holding the power supply terminal connecting portion 22a of the second bus ring 22 which is connected to the U-phase power supply terminal 221, a V-phase power supply fixing member 3V for holding the power supply terminal connecting portion 23a of the third bus ring 23 which is connected to the V-phase power supply terminal 231, and a W-phase power supply fixing member 3W for holding the power supply terminal connecting portion 24a of the fourth bus ring 24 which is connected to the W-phase power supply terminal 241.

Meanwhile, the plural connection terminals 4 are connected to the first to fourth bus rings 21 to 24 by fusing. For the fusing, insulators 201 on the outer peripheries of the first to fourth bus rings 21 to 24 at positions to be connected to the connection terminals 4 are removed, the exposed inner conductors are plated, and the plated portions are sandwiched by end portions, on one side, of the connection terminals 4 and are clamped by applying heat and pressure.

Among the first to fourth bus rings 21 to 24, the first bus ring 21 which is located at an end in the axis direction of these bus rings is locked to locking portions 30 of the fixing members 3 and is thereby removably fixed to the fixing members 3. In other words, the first bus ring 21 is fixed by being fitted into and caught by the locking portions 30 of the fixing members 3.

The second to fourth bus rings 22 to 24 are fixed to fixing portions 31 of the fixing members 3 by molding the fixing members 3. In other words, the second to fourth bus rings 22 to 24 are fixed to the fixing members 3 by being molded together with the fixing members 3 at the time of molding.

The first bus ring 21 is sprit at the separated portion 210 between the end portion 21a and the other end portion 21b in a circumferential direction thereof.

Figure 3A:
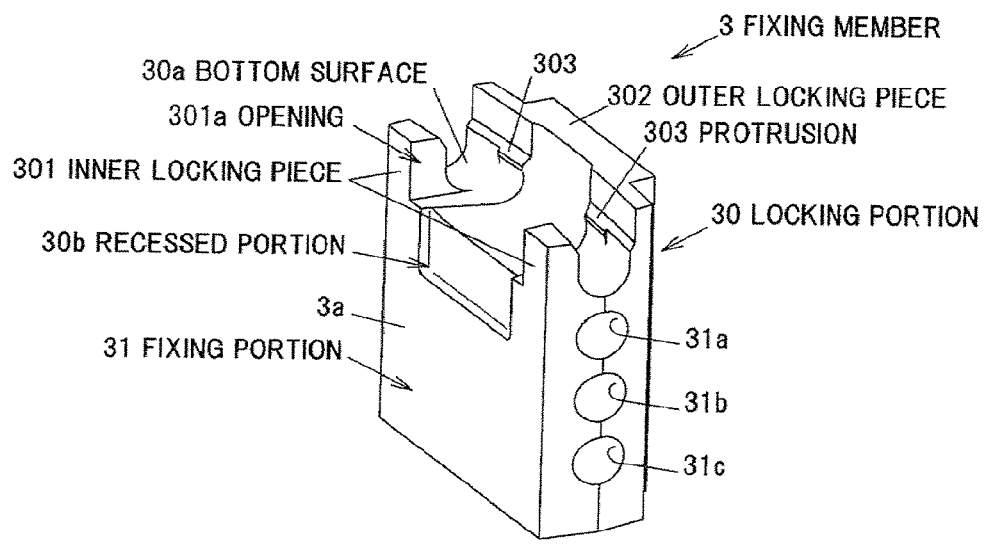
FIG. 3A is a perspective view showing an external appearance of a fixing member.
Figure 3B:
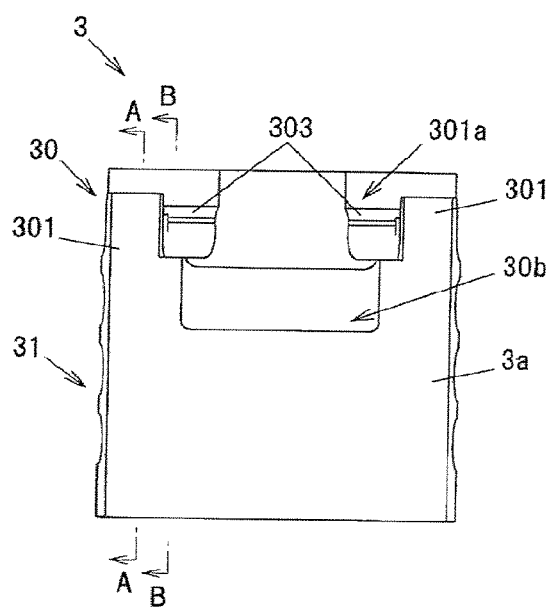
FIG. 3B is a front view of the fixing member and FIG. 3C is a side view of the fixing member.
Figure 3C:
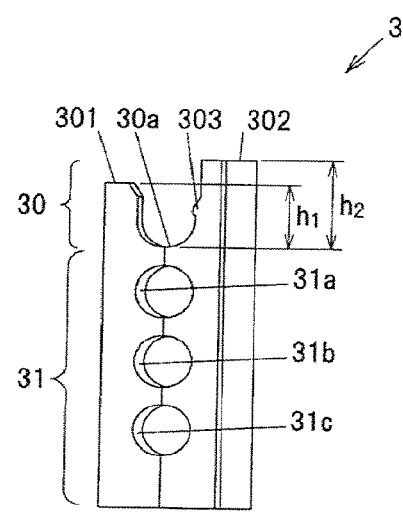

FIG. 3 shows an external appearance of the fixing member 3, wherein FIG. 3A is a perspective view, FIG. 3B is a front view and FIG. 3C is a side view.

The locking portion 30 of the fixing member 3 opens to one side in the axis direction of the electricity collection and distribution ring 2. The locking portion 30 is capable of locking the first bus ring 21. A curved bottom surface 30a is formed on a bottom portion of the locking portion 30 in the axis direction. In addition, the locking portion 30 has an inner locking piece 301 and an outer locking piece 302 which face each other with the bottom surface 30a interposed therebetween. The inner locking piece 301 and the outer locking piece 302 are formed so as to protrude in the axis direction from the bottom surface 30a.

The inner locking piece 301 is provided on the inner peripheral side of the electricity collection and distribution ring 2 with respect to the bottom surface 30a. The outer locking piece 302 is provided on the outer peripheral side of the electricity collection and distribution ring 2 with respect to the bottom surface 30a.

As shown in FIGS. 3A and 3B, an opening 301a which opens to a radially inner side of the first bus ring 21 is formed on the inner locking piece 301. In addition, as shown in FIG. 3C, height $h_1$ of the inner locking piece 301 from the bottom surface 30a in the axis direction is formed lower than height $h_2$ of the outer locking piece 302 from the bottom surface 30a in the axis direction.

Furthermore, as shown in FIGS. 3A and 3B, a recessed portion 30b, which is formed continuously with the opening 301a so that a thickness of the fixing member 3 is reduced, is provided on a side surface 3a of the fixing member 3 on the radially inner side. The recessed portion 30b is formed so as to be recessed in the radial direction of the first bus ring 21.

The fixing member 3 also has the fixing portion 31 for mutually fixing the second to fourth bus rings 22 to 24 by molding. In other words, the fixing member 3 is formed by molding so as to integrally have the locking portion 30 and the fixing portion 31. The fixing portion 31 is provided side-by-side with the locking portion 30 in the axis direction and is formed simultaneously with the locking portion 30 by molding.

The fixing portion 31 is formed by molding in a state that the second to fourth bus rings 22 to 24 penetrate therethrough in a circumferential direction. Three through-holes 31a, 31b and 31c through which the second to fourth bus rings 22 to 24 respectively penetrate are formed on the fixing portion 31.

Figure 4A:
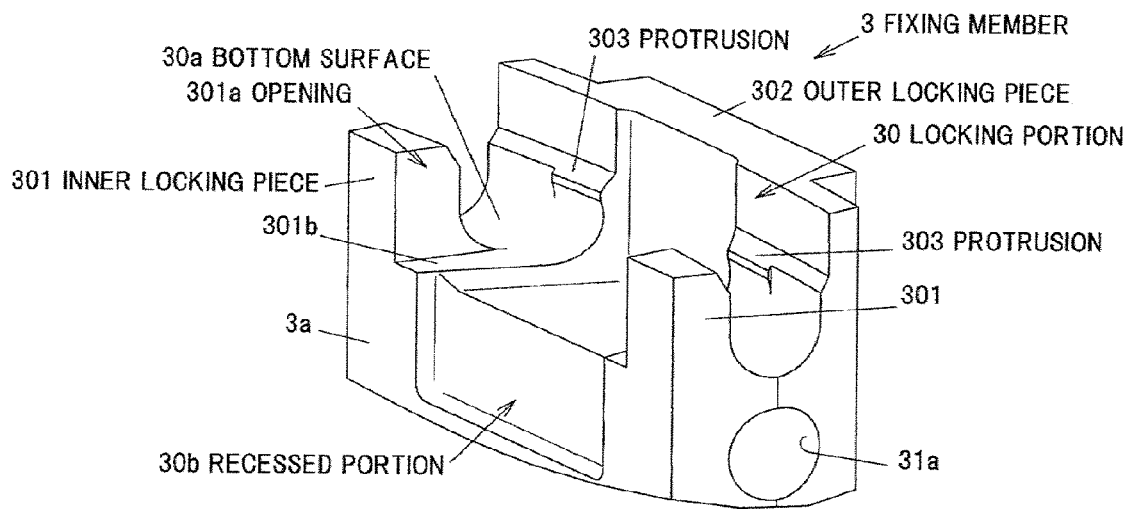
FIG. 4A is an enlarged perspective view showing a locking portion of the fixing member.
Figure 4B:
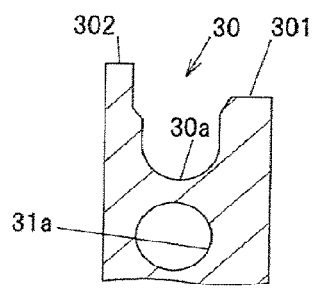
FIG. 4B is an end view when cutting along line A-A of FIG. 3B
Figure 4C:
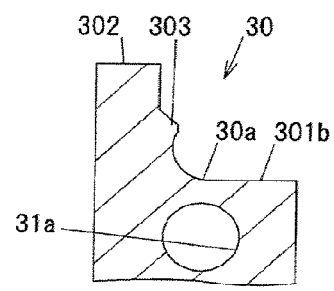
FIG. 4C is an end view when cutting along line B-B of FIG. 3B.

FIG. 4 shows the locking portion 30 of the fixing member 3, wherein FIG. 4A is an enlarged perspective view showing the locking portion 30, FIG. 4B is an end view when cutting along line A-A of FIG. 3B and FIG. 4C is an end view when cutting along line B-B of FIG. 3B.

As shown in FIGS. 4A and 4C, protrusions 303 are formed on the outer locking piece 302 at positions facing the opening 301a of the inner locking piece 301. The protrusion 303 is formed so as to protrude radially inward and holds the first bus ring 21 to prevent the first bus ring 21 from slipping out of the locking portion 30. In addition, a bottom surface 301b of the opening 301a located radially inward of the protrusion 303 is formed to be a flat surface which is continuous with the bottom surface 30a of the locking portion 30 and extends radially inward.

In addition, on the inner side surface of the outer locking piece 302, the protrusion 303 is not formed in a region where the side surface faces the inner locking piece 301 in the radial direction, as shown in FIG. 4B.

The protrusion 303 is integrally formed with the outer locking piece 302 by molding the fixing member 3. In addition, two protrusions 303 are formed on the outer locking piece 302 at positions corresponding to both circumferential side portions of the opening 301a. As shown in FIG. 4C, the protrusion 303 is formed so as to protrude radially inward along an outer peripheral surface of the first bus ring 21 which is locked to the locking portion 30. The protrusion 303 functions as a "barb" for restricting the first bus ring 21 from slipping out of the locking portion 30.

The electricity collection and distribution ring 2 configured as described above is arranged around the outer periphery of the three-phase motor 1, and the connection terminals 4 are respectively clamped and fixed to the first lead-out lines 111a, 112a and 113a and the second lead-out lines 111b, 112b and 113b of the U-, V- and W-phase coils 111, 112 and 113.

Figure 5A:
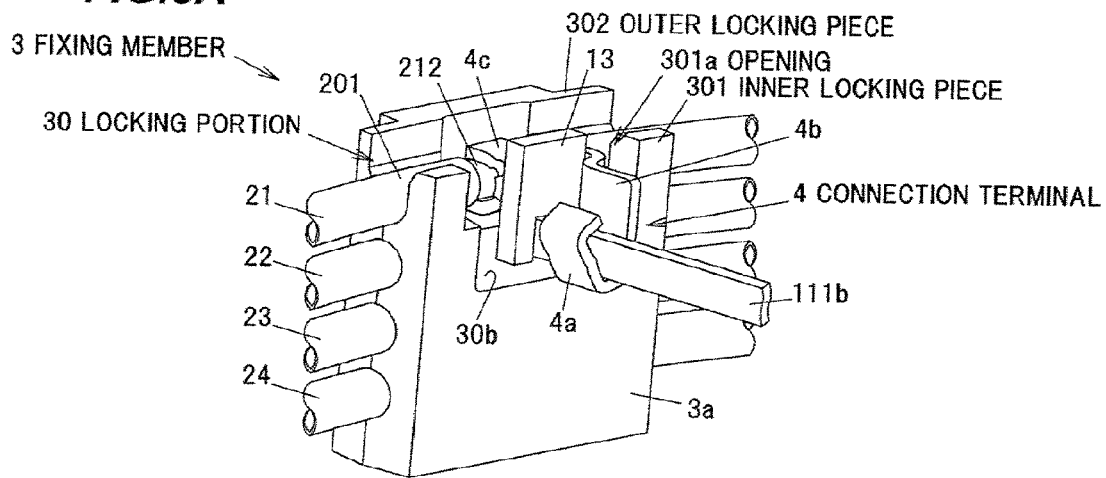
FIG. 5A is a perspective view of the fixing member and periphery thereof in a state that a lead-out line of the three-phase motor is connected to a connection terminal of a first bus ring.
Figure 5B:
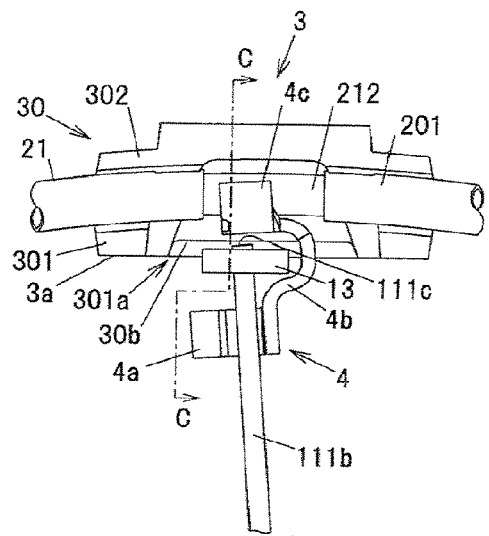
FIG. 5B is a top view and FIG. 5C is a cross sectional view taken on line C-C of FIG. 5B.
Figure 5C:
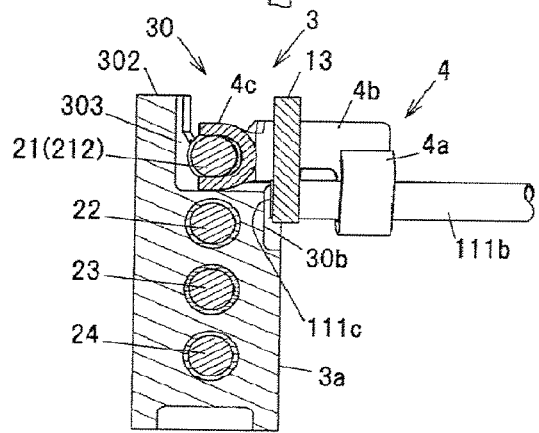

FIG. 5 shows the fixing member 3 and periphery thereof in a state that a lead-out line (the second lead-out line 111b of U-phase in the example shown in this drawing) of the three-phase motor 1 is connected to the connection terminal 4 which is provided on the first bus ring 21, wherein FIG. 5A is a perspective view, FIG. 5B is a top view and FIG. 5C is a cross sectional view taken on line C-C of FIG. 5B.

As shown in FIGS. 5A and 5B, the connection terminal 4 of the first bus ring 21 is connected to the first bus ring 21 through the opening 301a of the inner locking piece 301 of the fixing member 3.

In more detail, the connection terminal 4 is arranged so that an end portion 4a thereof protrudes radially inward of the first bus ring 21. Then, the end portion 4a is clamped and fixed to the second lead-out line 111b and is electrically connected to the second lead-out line 111b. Another end portion 4c of the connection terminal 4 is fused and electrically connected to an inner conductor 212 which is exposed by removing the insulator 201 from the first bus ring 21. A main body 4b of the connection terminal 4 is located between the end portion 4a and the other end portion 4c so that at least a portion thereof passes through the opening 301a of the fixing member 3.

Meanwhile, as shown in FIGS. 5B and 5C, a tip portion 111c of the second lead-out line 111b is supported by a supporting member 13 formed of a non-conductive material and is located in the recessed portion 30b formed on the side surface 3a of the fixing member 3.

Method for Manufacturing Electricity Collection and Distribution Ring 2

Next, a method for manufacturing the electricity collection and distribution ring 2 will be described in reference to FIGS. 6 to 8. FIGS. 6A to 6D are diagrams illustrating a manufacturing procedure of the second to fourth bus rings 22 to 24.

Figure 6A:
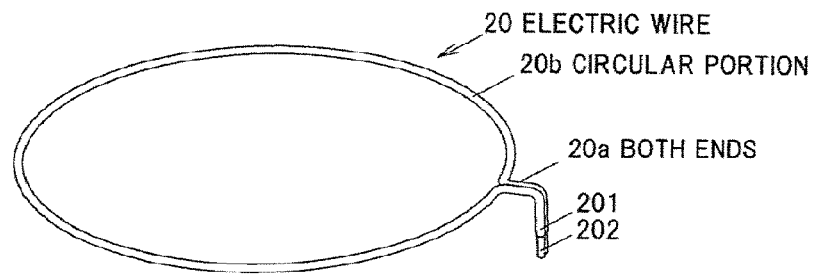
FIGS. 6A to 6D are diagrams illustrating a manufacturing procedure of second to fourth bus rings.

FIG. 6A shows a state in which an electric wire 20 to be (one of) the second to fourth bus rings 22 to 24 is shaped into an annular shape. In the electric wire 20, a portion excluding both ends 20a is shaped into a circular portion 20b having a circular shape and the both ends 20a protrude radially outward from the circular portion 20b. The both ends 20a are to be the power supply terminal connecting portion 22a, 23a or 24a of the second to fourth bus rings 22 to 24. In addition, at a tip portion of the electric wire 20, the insulator 201 is removed and a conductor 202 is exposed.

Figure 6B:
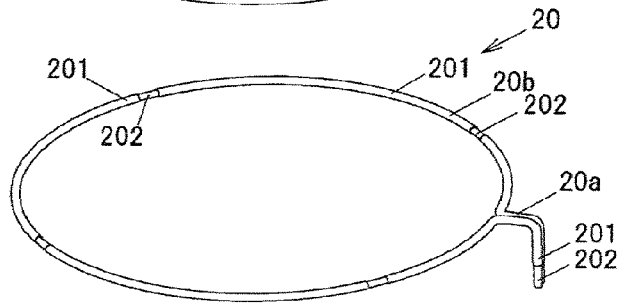

FIG. 6B shows a state in which a pre-process for fusing of the connection terminal 4 is performed at four positions on the circular portion 20b of the electric wire 20 which is formed as described above. In this pre-process, the insulator 201 of portions to be connected to the connection terminals 4 is removed and the exposed surface of the conductor 202 is plated with a metal such as tin.

Figure 6C:
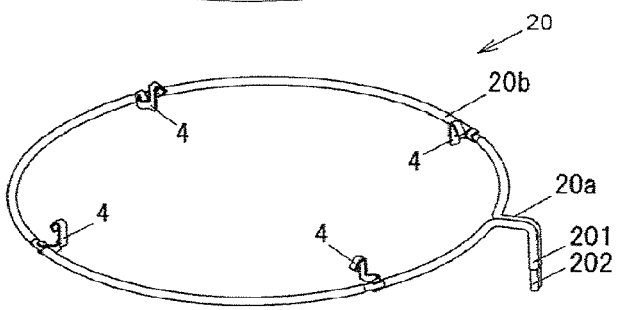
Figure 6D:
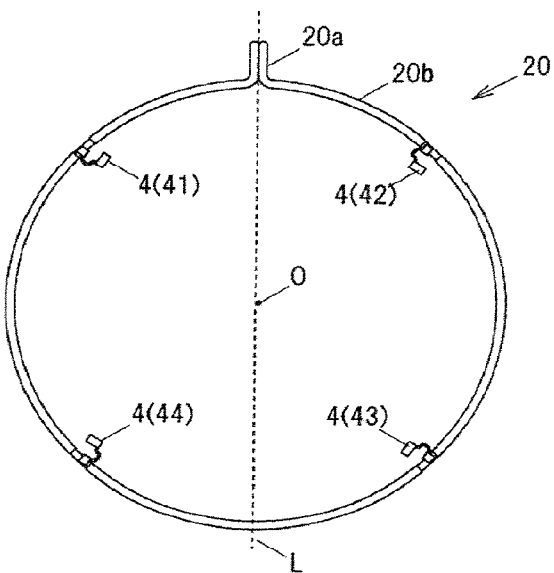

FIG. 6C shows a state in which four connection terminals 4 are respectively fused to the plated portions of the electric wire 20. FIG. 6D is a front view when the state shown in FIG. 6C is viewed from an axis direction of the electric wire 20.

As shown in FIG. 6D, the four connection terminals 4 are provided so as to form pairs at positions symmetric with respect to a straight line L extending in a diametrical direction of the circular portion 20b of the electric wire 20 and including the both ends 20a (the power supply terminal connecting portion 22a, 23a or 24a). In more detail, among the four connection terminals 4, a first connection terminal 41 and a second connection terminal 42 are provided at positions symmetric with respect to the straight line L so as to form a pair, and a third connection terminal 43 and a fourth connection terminal 44 are provided at positions symmetric with respect to the straight line L so as to form a pair. In the present embodiment, the first to fourth connection terminals 41 to 44 are arranged at every 90° along a circumferential direction and the both ends 20a are located at the circumferentially middle between the first connection terminal 41 and the second connection terminal 42.

Figure 7:
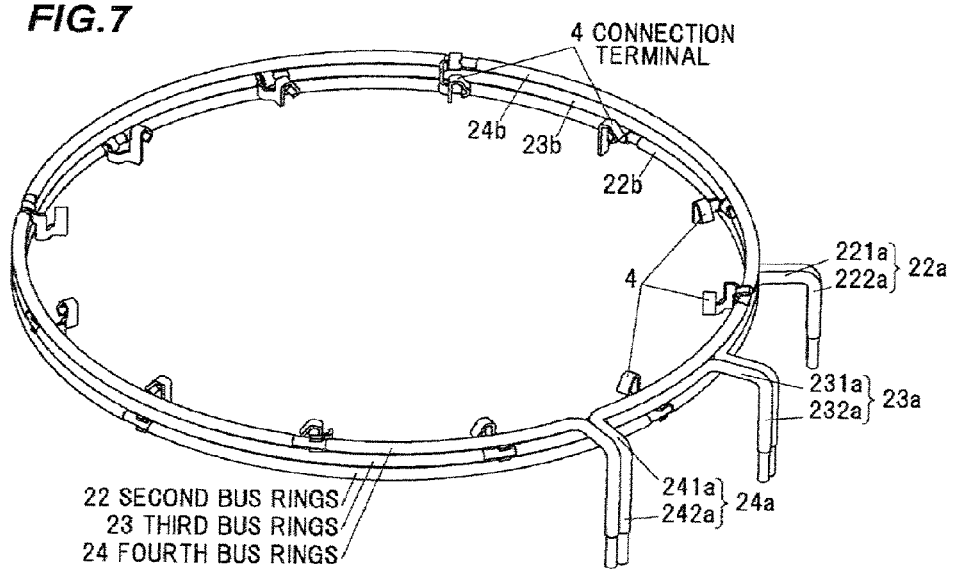
FIG. 7 is an appearance diagram illustrating a state in which the second to fourth bus rings are arranged along an axis direction.

FIG. 7 shows a state in which three electric wires 20 having which the connection terminals 4 assembled therewith as described above are arranged as the second to fourth bus rings 22 to 24 so as to be parallel to each other along the axis direction. The second to fourth bus rings 22 to 24 have the power supply terminal connecting portions 22a, 23a and 24a corresponding to the both ends 20a, and circular portions 22b, 23b and 24b corresponding to the circular portion 20b.

The power supply terminal connecting portions 22a, 23a and 24a are arranged so as to be out of phase with each other by 30°. In addition, the power supply terminal connecting portions 22a, 23a and 24a have protruding portions 221a, 231a and 241a protruding radially outward from the circular portions 22b, 23b and 24b and extension portions 222a, 232a and 242a extending along the axis direction from the radially outward ends of the protruding portions 221a, 231a and 241a. The second to fourth bus rings 22 to 24 have the same shape and size except the axial length of the extension portions 222a, 232a and 242a.

Figure 8:
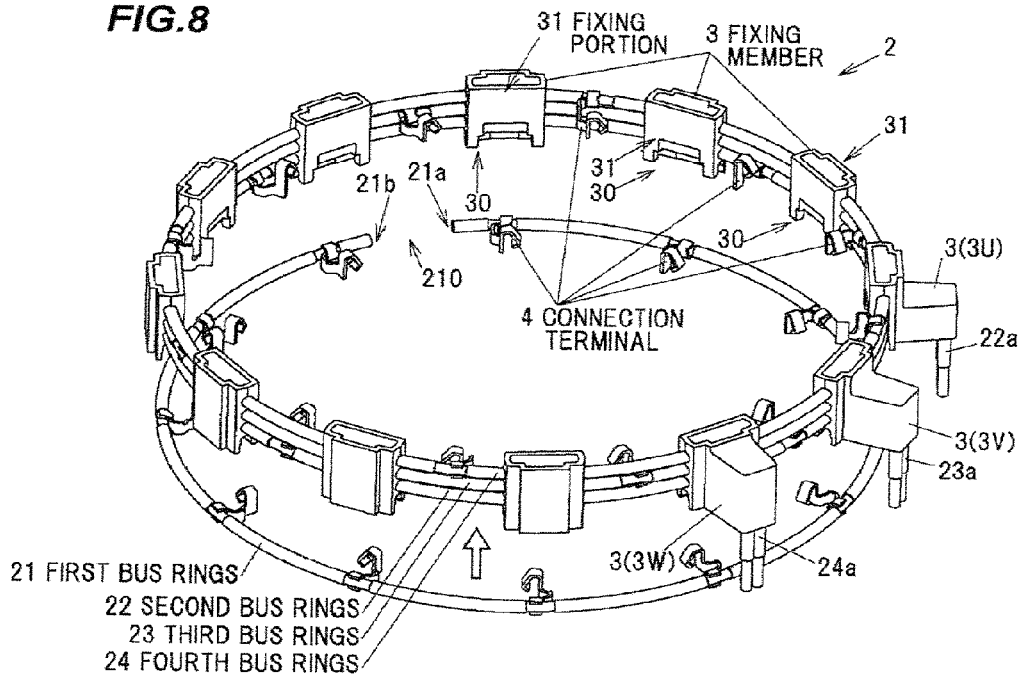
FIG. 8 is an appearance diagram illustrating a state in which the fixing members are molded along a circumferential direction of the second to fourth bus rings.

FIG. 8 is a diagram illustrating a state in which twelve fixing members 3 including the U-phase power supply fixing member 3U, the V-phase power supply fixing member 3V and the W-phase power supply fixing member 3W are molded along the circumferential direction of the second to fourth bus rings 22 to 24, illustrating together with the first bus ring 21 before being assembled. As shown in this drawing, each connection terminal 4 of the second to fourth bus rings 22 to 24 is provided between a pair of circumferentially-adjacent fixing members 3.

Each fixing member 3 is molded using three molds (none of them are shown in the drawing), which are an inner mold radially slidable on the inner side of the second to fourth bus rings 22 to 24, an outer mold radially slidable on the outer side of the second to fourth bus rings 22 to 24 and a fixed mold on which surface the inner and outer molds slide. The second to fourth bus rings 22 to 24 are sandwiched between the inner and outer molds.

In the locking portion 30 of the fixing member 3, a space between the inner locking piece 301 and the outer locking piece 302 is formed by a protrusion provided on the fixed mold in a protruding manner. Meanwhile, the protrusions 303 of the outer locking piece 302 are formed by recessed portions provided on the inner mold. A pair of the inner and outer molds is provided for each fixing member 3 and a molding resin is injected and cured in a space formed between these molds, thereby forming each fixing member 3.

The first bus ring 21 is fitted from the axis direction and locked to the locking portion 30 of each fixing member 3 formed described above and the power supply terminals 221, 231 and 241 are clamped and fixed to the power supply terminal connecting portions 22a, 23a and 24a, thereby obtaining the electricity collection and distribution ring 2 shown in FIG. 2.

Functions and Effects of the Present Embodiment

According to the present embodiment as described above, the following functions and effects are obtained.

(1) The second to fourth bus rings 22 to 24 are fixed by molding the fixing members 3 and the first bus ring 21 is assembled with the fixing members 3 after the molding.

Therefore, it is possible to reduce the number of the connection terminals 4 which are connected to each bus ring at the time of molding as compared to the case where the first to fourth bus rings 21 to 24—including the first bus ring 21—are molded all together. In more detail, while the molding in case of molding the first to fourth bus rings 21 to 24 all together is performed in a state that twenty four connection terminals 4 are provided, the molding in the present embodiment is performed in a state that twelve connection terminals 4 are provided on the second to fourth bus rings 22 to 24.

As a result, it is possible to relatively easily provide a space for attaching the molds for the molding, which facilitates the molding of the fixing members 3. In addition, an increase in a diameter of the electricity collection and distribution ring 2 in order to provide a space for attaching the molds can be avoided. Furthermore, it is possible to increase a circumferential width of the fixing member 3, which allows durability of the electricity collection and distribution ring 2 to be enhanced.

(2) The fixing members 3 are arranged at positions where the connection terminals 4 of the first bus ring 21 are provided. Since this allows spaces for connecting the connection terminals 4 of the first bus ring 21 to be provided at positions overlapping with the fixing members 3, it is possible to downsize the electricity collection and distribution ring 2. In addition, since the first bus ring 21 is fixed to the fixing members 3 after fusing the connection terminals 4 to the first bus ring 21, a plating formed on the first bus ring 21 for fusing of the connection terminals 4 is not peeled off at the time of molding.

(3) In the locking portion 30 of the fixing member 3, the height $h_1$ of the inner locking piece 301 from the bottom surface 30a in the axis direction is lower than the height $h_2$ of the outer locking piece 302 from the bottom surface 30a in the axis direction. Accordingly, it is possible to press the first bus ring 21 toward the bottom surface 30a along the outer locking piece 302 when locking the first bus ring 21 to the locking portion 30 of the fixing member 3. As a result, attachment of the first bus ring 21 is easier than the case where, e.g., the height of the inner locking piece 301 is the same as that of the outer locking piece 302.

(4) Since the connection terminal 4 of the first bus ring 21 connects the first bus ring 21 to the second lead-out line 111b, 112b or 113b of each of phase coils 111, 112 and 113 through the opening 301a of the fixing member 3, it is possible to prevent the connection terminal 4 from protruding in the axis direction beyond the outer locking piece 302 of the fixing member 3. In other words, when, for example, the connection terminal 4 is connected to the second lead-out line 111b, 112b or 113b above the axial tip portion of the inner locking piece 301, the connection terminal 4 protrudes in the axis direction from the fixing member 3 and a radial size of the electricity collection and distribution ring 2 is thereby increased. However, such an increase in the size can be avoided.

(5) Since the protrusions 303 protruding radially inward are formed on the outer locking piece 302, it is possible to restrict the first bus ring 21 from slipping out of the locking portion 30. In addition, the protrusions 303 do not face the inner locking piece 301 in the radial direction, which allows the first bus ring 21 to be locked to the locking portion 30 by slightly bending the first bus ring 21 in the radial direction without greatly deforming the inner locking piece 301 or the outer locking piece 302.

(6) Since the plural fixing members 3 are arranged at regular intervals along the circumferential direction of the electricity collection and distribution ring 2, it is possible to suppress strength variation in the circumferential direction of the electricity collection and distribution ring 2.

(7) The first bus ring 21 is split at one circumferential point which is the separated portion 210. Therefore, when fixing the first bus ring 21 to each fixing member 3, it is possible to lock to the locking portion 30 of each fixing member 3 sequentially from, e.g., the end portion 21a toward the other end portion 21b of the first bus ring 21. This facilitates attachment of the first bus ring 21.

(8) Since the recessed portion 30b is formed on the side surface 3a of each fixing member 3 on the inner peripheral side thereof, it is possible to accommodate the tip portion of the second lead-out line 111b, 112b or 113b in the recessed portion 30b. This allows the radial size of the electricity collection and distribution ring 2 to be reduced by a size corresponding to a radial depth of the recessed portion 30b.

(9) A bus ring fixed to the fixing members 3 after molding of the fixing members 3 is determined as the first bus ring 21 which is a neutral phase of the three-phase motor 1. In other words, of the first to fourth bus rings 21 to 24, the first bus ring 21 having the largest number of the connection terminals 4 connected thereto is locked to the locking portions 30 of the fixing members 3. Therefore, it is possible to reduce the number of the connection terminals 4 which are connected to the bus rings at the time of molding the fixing members 3 and this facilitates providing a space for attaching the molds for the molding. In addition, it is possible to increase a circumferential width of the fixing member 3, which allows durability of the electricity collection and distribution ring 2 to be enhanced.

(10) The plural connection terminals 4 of the second to fourth bus rings 22 to 24 are provided at positions symmetric with respect to the diametrical straight line L which passes through the power supply terminal connecting portion 22a, 23a or 24a. Therefore, after performing the pre-process for fusing to the first to fourth bus rings 21 to 24, the connection terminals 4 are fused to these bus rings without paying attention to front and back sides of the bus rings and the power supply terminal connecting portions 22a, 23a and 24a are then bent to form the extension portions 222a, 232a and 242a. As a result, it is possible to facilitate the manufacturing of the electricity collection and distribution ring 2.

Although the embodiment of the invention has been described above, the invention according to claims is not to be limited to the above-mentioned embodiment. Further, please note that all combinations of the features described in the embodiment are not necessary to solve the problem of the invention.

For example, the plural connection terminals 4 of the first bus ring 21 may be arranged at positions shifted from the fixing members 3 in the circumferential direction. In addition, the fixing member 3 may be configured such that the second bus ring 22 and the third bus ring 23 are fixed by molding and the first bus ring 21 located at an axial end and the fourth bus ring 24 located at another axial end are fixed by locking to two locking portions 30. In other words, the fixing member may have the locking portions at both axial ends such that two bus rings located at both axial ends of the electricity collection and distribution ring are respectively locked to a pair of locking portions of the fixing member. Furthermore, the structure and shape of the locking portion 30 and the periphery thereof are not limited to those in the above-mentioned embodiment.

In addition, although the connection terminals 4 are fused and connected after removing the insulator 201 in FIG. 6B, it is possible to directly fuse and connect the connection terminals 4 without removing the insulator 201.

It should be noted that, the three-phase motor 1 can be used as an electric motor in which the shaft 120 is rotated by magnetic force generated by an electric current supplied to the U-, V- and W-phase coils 111, 112 and 113 and it is also possible to use as an electric motor in which rotational force of the shaft 120 is converted into and output as electrical energy.

REFERENCE SIGNS LIST

1: three-phase motor
2: electricity collection and distribution ring
3: fixing member
3U, 3V, 3W: power supply fixing member
3a: side surface
4: connection terminal
4a: end portion
4b: main body
4c: other end portion
11: stator
12: rotor
13: supporting member
20: electric wire
20a: both ends
20b: circular portion
21 to 24: first to fourth bus rings
21a: end portion
21b: other end portion
22a, 23a, 24a: power supply terminal connecting portion
22b, 23b, 24b: circular portion
30: locking portion
30a: bottom surface
30b: recessed portion
31: fixing portion
31a, 31b, 31c: through-hole
41 to 44: first to fourth connection terminals
110: teeth
111: U-phase coil
112: V-phase coil
113: W-phase coil
111a, 112a, 113a: first lead-out line
111b, 112b, 113b: second lead-out line
111c: tip portion
120: shaft
121: magnet
201: insulator
202: conductor
210: separated portion
212: conductor
221, 231, 241: power supply terminal
221a, 231a, 241a: protruding portion
222a, 232a, 242a: extension portion
301: inner locking piece
301a: opening
301b: bottom surface
302: outer locking piece
303: protrusion

The invention claimed is:

1. An electricity collection and distribution ring, comprising:
    a plurality of annular conductors for collecting and distributing electricity from and to a plurality of phase coils;
    a plurality of fixing members that are disposed at a plurality of predetermined positions along a circumferential direction of the plurality of annular conductors to mutually fix the plurality of annular conductors in a state that the plurality of annular conductors are arranged along an axis direction thereof; and
    a plurality of connection terminals for connecting the annular conductors to lead-out lines of the coils,
    wherein the fixing member integrally comprises a fixing portion for mutually fixing the plurality of annular conductors by molding except a first annular conductor and a locking portion capable of locking the first annular conductor, the first annular conductor being positioned at an end in an axis direction of the plurality of annular conductors, and the first annular conductor is fixed to the plurality of fixing members by being locked to the locking portion.

2. The electricity collection and distribution ring according to claim 1, wherein the plurality of fixing members are arranged at positions where the plurality of connection terminals of the first annular conductor are provided.

3. The electricity collection and distribution ring according to claim 1, wherein the locking portion of the fixing member comprises a bottom surface formed on a bottom portion in the axis direction, an inner locking piece provided on an inner peripheral side of the bottom surface and an outer locking piece provided on an outer peripheral side of the bottom surface, and height of the inner locking piece from the bottom surface is lower than height of the outer locking piece from the bottom surface.

4. The electricity collection and distribution ring according to claim 3, wherein the inner locking piece of the fixing member comprises an opening formed to open to a radially inner side of the first annular conductor and the connection terminal of the first annular conductor is connected to the first annular conductor through the opening of the inner locking piece.

5. The electricity collection and distribution ring according to claim 4, wherein protrusions for holding the first annular conductor are provided on the outer locking piece at positions facing the opening of the inner locking piece so as to protrude toward the radially inner side.

6. The electricity collection and distribution ring according to claim 1, wherein the plurality of fixing members are arranged at regular intervals along the circumferential direction of the plurality of annular conductors.

7. The electricity collection and distribution ring according to claim 1, wherein the first annular conductor is split at one circumferential point.

8. The electricity collection and distribution ring according to claim 1, wherein a recessed portion recessed in a radial direction of the first annular conductor is formed on the fixing member at a position facing a tip portion of the lead-out line connected to the coil.

9. The electricity collection and distribution ring according to claim 1, wherein the plurality of annular conductors fixed to the fixing portions of the fixed members are second to fourth annular conductors for supplying power to each of phase coils of a three-phase motor, and the first annular conductor is a neutral phase of the three-phase motor.

10. The electricity collection and distribution ring according to claim 9, wherein the second to fourth annular conductors each comprises a power supply portion at a circumferential position, and the plurality of connection terminals are provided so as to form pairs at positions symmetric with respect to a diametrical straight line including the power supply portion.

11. A method for manufacturing an electricity collection and distribution ring, the electricity collection and distribution ring comprising:

a plurality of annular conductors for collecting and distributing electricity from and to a plurality of phase coils;

a plurality of fixing members that are disposed at a plurality of predetermined positions along a circumferential direction of the plurality of annular conductors to mutually fix the plurality of annular conductors in a state that the plurality of annular conductors are arranged along an axis direction thereof; and a plurality of connection terminals for connecting the annular conductors to lead-out lines of the coils, and the method comprising:

a step of mutually fixing the plurality of annular conductors, except a first annular conductor positioned at an end in an axis direction thereof, by molding the fixing member; and a step of locking the first annular conductor to a locking portion that is formed on each of the plurality of fixing members by the molding.

\* \* \* \* \*